C. S. WHITE.
FAUCET.
APPLICATION FILED OCT. 8, 1912.
1,082,575.
Patented Dec. 30, 1913.
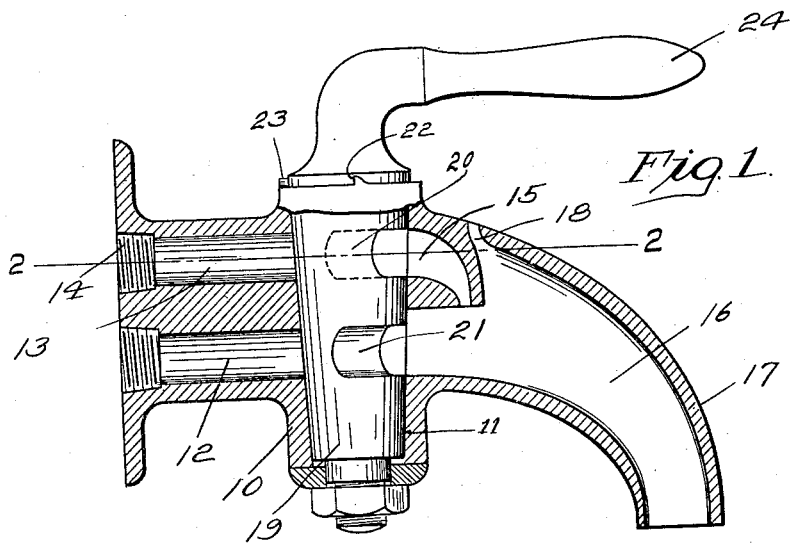
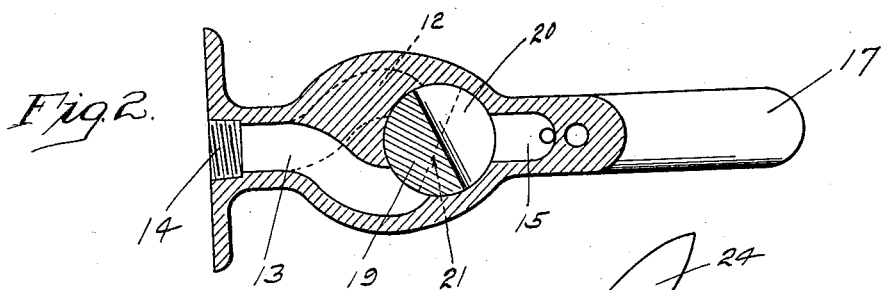
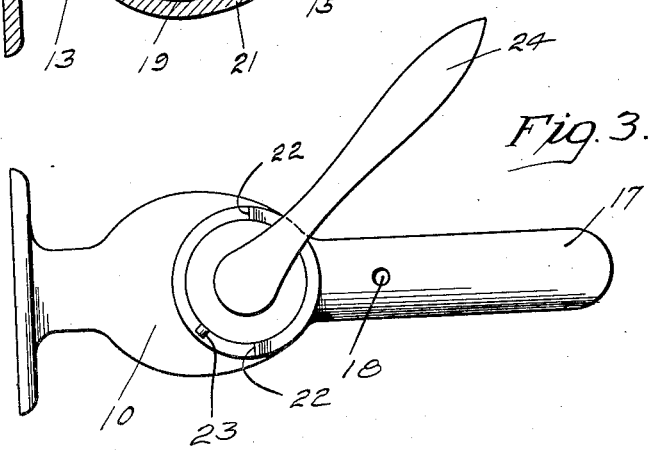
Inventor
Charles S. White.
Witnesses
By Harry C. Schroeder
Attorney

UNITED STATES PATENT OFFICE.

CHARLES S. WHITE, OF OAKLAND, CALIFORNIA, ASSIGNOR OF ONE-HALF TO ANDREW HUNKER, OF BERKELEY, CALIFORNIA.

FAUCET.

1,082,575.

Specification of Letters Patent.　　Patented Dec. 30, 1913.

Application filed October 8, 1912.　Serial No. 724,611.

*To all whom it may concern:*

Be it known that I, CHARLES S. WHITE, a citizen of the United States, residing at Oakland, in the county of Alameda and State of California, have invented certain new and useful Improvements in Faucets, of which the following is a specification.

This invention relates to faucets and has special reference to that type of faucet used for drawing a supply of liquid selectively from different sources.

The principal object of the invention is to provide a faucet of this character having improved general construction.

A second object of the invention is to provide an improved faucet of this character especially adapted to draw off liquids charged with gas, such as carbonated water, beer, or the like, the faucet being so arranged that a portion of the charged gas is liberated as the liquid passes through the faucet and allowed to escape therefrom independently of the escape of the liquid thereby preventing excessive frothing or foaming in the vessel in which it is discharged.

With the above and other objects in view as will be hereinafter apparent the invention consists in general of certain novel constructions, combinations and arrangements of parts, as will be hereinafter fully described, illustrated in the accompanying drawings, and specifically claimed.

In the drawings:—Figure 1 is a vertical median section through a faucet constructed in accordance with this invention. Fig. 2 is a section on the line 2—2, Fig. 1. Fig. 3 is a plan view of the faucet showing the same in position to draw fluid from the lower pipe.

In carrying out the objects of this invention there is provided a body 10 having an inverted frusto-conical opening 11 extending therethrough and communicating with this opening is a lower passage 12 and an upper passage 13. These passages 12 and 13 extend oppositely to each other and engage opposite sides of the opening 11. These passages furthermore are provided with threaded ends 14 for the purpose of connecting the supply pipes.

Leading from the opening 13 is a curved and tapered passage 15 which opens into a similar but larger passage 16 formed in the nozzle end 17 of the body.

At the upper part of the nozzle end of the body there is provided a port or vent 18 which opens upward into the air from the passage 16. Fitted within the opening 11 is a valve 19 provided with ports 20 and 21 which are placed at an angle to each other.

The body is provided with the usual stop shoulders 22 and on the plug valve is a pin 23 arranged to contact with one or the other of the stop shoulders. The valve is also provided with the usual handle 24.

In using this device the handle is turned so as to bring one or the other of the ports 20 or 21 in communication with the respective passages 13 or 12, thereby allowing the liquid to flow through these passages. It is to be noted that the liquid which is most inclined to foam is to have its supply pipe attached to the passage 13 so that in its way out from the faucet it passes through the curved passage 15 and strikes on the lower side of the passage 16 thus permitting a certain amount of the charged gas to escape through the opening 18. In this way there will be less foaming or frothing of the liquid in the vessel in which it is drawn.

There has thus been provided a simple and efficient device of the kind described, and for the purpose specified.

It will be seen that the downwardly extending tapered passage 15 extends beyond the end of the lower inlet passage 12 and in that way provides against any of the liquid that passes through the upper inlet passage 13 from running into the port 21 and probably back into the lower inlet passage 12. This is accomplished by discharging the liquid that passes through the upper inlet passage 13 far enough in the outlet passage 16 to insure it passing immediately out through the outlet passage 16.

Having thus described the invention, what is claimed as new, is:—

1. In a faucet of the kind described, a body provided with an upper and a lower inlet passage, said upper passage having a downwardly curved tapered extremity, said body provided with an outlet passage into which said upper and lower inlet passages open, said outlet passage provided with an air vent and a valve carried by said body and provided with a plurality of ports, said passages and ports being arranged for selective control of the respective inlet passages.

2. In a faucet of the kind described, a body provided with an upper and lower inlet passage, said body provided with an enlarged portion having a downwardly curved tapered discharge opening formed therein registering with said upper passage and extending beyond the discharge opening of said lower passage, said discharge openings of said inlet passages opening into a downwardly tapered outlet passage of said body, said outlet passage provided with an air vent in its upper portion, a valve carried by body provided with ports extending at an angle to each other, said ports and passages being arranged for selective control of the respective inlet passages.

In testimony whereof I affix my signature in presence of two witnesses.

CHARLES S. WHITE.

Witnesses:
ANDREW HUNKER,
F. P. SCHROEDER.